United States Patent [19]
Solomon et al.

[11] Patent Number: 6,011,923
[45] Date of Patent: Jan. 4, 2000

[54] SINGLE USE CAMERA HAVING FLEXURE OF A FRONT COVER CONSTRAINED BY AN EXPOSED-FILM DOOR

[75] Inventors: Jeffrey A. Solomon, Spencerport; David Barclay, Bergen, both of N.Y.

[73] Assignee: Eastman Kodak Company, Rochester, N.Y.

[21] Appl. No.: 09/013,503

[22] Filed: Jan. 26, 1998

[51] Int. Cl.[7] .................................................. G03B 17/02
[52] U.S. Cl. ........................................................... 396/6
[58] Field of Search ................................. 396/6, 538, 541

[56] References Cited

U.S. PATENT DOCUMENTS 5,752,086  5/1998  Negishi et al. ............................... 396/6
5,754,911  5/1998  Noguchi ................................... 396/538

Primary Examiner—Howard B. Blankenship
Attorney, Agent, or Firm—Robert Luke Walker

[57] ABSTRACT

A single use camera that has flexure of a front cover constrained by and exposed-film door. The camera has a frame and a back cover attached to the frame. The frame and back cover together define a film path and an exposed-film removal opening communicating with the film path. The front cover is mounted over the frame opposite the back cover. The door is attached to the frame. The door is discrete from the covers and frame. The door light-tightly closes the opening independent of the front cover. The door is reversibly removable from the frame. The door constrains flexure of the front cover in a direction outward from the frame.

21 Claims, 8 Drawing Sheets

SINGLE USE CAMERA HAVING FLEXURE OF A FRONT COVER CONSTRAINED BY AN EXPOSED-FILM DOOR

FIELD OF THE INVENTION

The invention relates to photography and photographic equipment and more particularly relates to a single use camera in which flexure of a front cover is constrained by an exposed-film door.

BACKGROUND OF THE INVENTION

In single use cameras, after the photographic film is exposed by the user, the entire camera is submitted for film processing. The exposed film is removed from the camera and the camera is then, generally, returned to the camera manufacturer for recycling. Commonly in recycling, some parts of the camera are used for polymer feedstock, while other parts are inspected, tested, and reused. It is important to the camera manufacturer that the returned cameras be in suitable condition for recycling. It is thus important that the film processor be able to quickly and easily remove the film from the camera. If film removal is difficult or slow, it is common practice for film processors to smash single use cameras to remove the exposed film. This is detrimental to part reuse.

To make film removal easier, some single use cameras have included break-away access portions over the exposed film chamber. In these cameras, the access portion is bent until fracture occurs along a line of weakness. If case is exercised, the access portion can be bent back, without breaking, and can remain attached as a flap, extending outward from the remainder of the camera body. In some other single use cameras, a similar access portion has a line of weakness that is easily bendable, but is resistant to fracture. Single use cameras of these types have the shortcoming that cameras returned for recycling do not have a uniform configuration. The access portion can be in place, and bent at any of a variety of angles; or, in some cases, can be separated. This adds to the complexity of handling the returned cameras. These cameras have the additional problem that the camera must be configured so as to avoid overstressing of the line of weakness during camera use, but permit easy overstressing for film removal. A solution to this problem has been to fasten the cover including the break-away portion to the remainder of the camera, like a hinged door. The line or weakness acts like a hinge and a fastener, positioned opposite the line of weakness, takes the place of a latch. To hold the covers in position, one or more cover fasteners are provided just beyond the break-away portion. This approach accommodates the degradation in structural integrity of the camera body caused by the presence of the exposed-film door and works well with simple camera shapes and cameras having lots of free interior space. This approach is cumbersome, at best, when applied to complexly shaped small cameras.

Other single use cameras have used discrete exposed-film doors. These cameras provide a uniform configuration on camera return for recycling. Some of these cameras have an exposed-film door held by a back cover and frame and loosely attached to a non-light-tight front cover. Front cover dimensions are not critical to light-tightness, but the front cover must be shaped to accommodate the lack of constraint in the area of the exposed-film door. Other single use cameras have discrete film doors that engage and form a light-block with both front and back covers. This approach allows the front cover to be constrained by the exposed-film door, but makes the dimensions and fit of the covers critical to light-tightness.

It would thus be desirable to provide a single use camera in which an exposed-film door is easy to remove, front cover dimensions are not critical to light-tightness, and the front cover is constrained by the exposed-film door.

SUMMARY OF THE INVENTION

The invention is defined by the claims. The invention, in its broader aspects, provides a single use camera that has flexure of a front cover constrained by and exposed-film door. The camera has a frame and a back cover attached to the frame. The frame and back cover together define a film path and an exposed-film removal opening communicating with the film path. The front cover is mounted over the frame opposite the back cover. The door is attached to the frame. The door is discrete from the covers and frame. The door light-tightly closes the opening independent of the front cover. The door is reversibly removable from the frame. The door constrains flexure of the front cover in a direction outward from the frame.

It is an advantageous effect of at least some of the embodiments of the invention that a single use camera is provided in which an exposed-film door is easy to remove, front cover dimensions are not critical to light-tightness, and the front cover is constrained by the exposed-film door.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
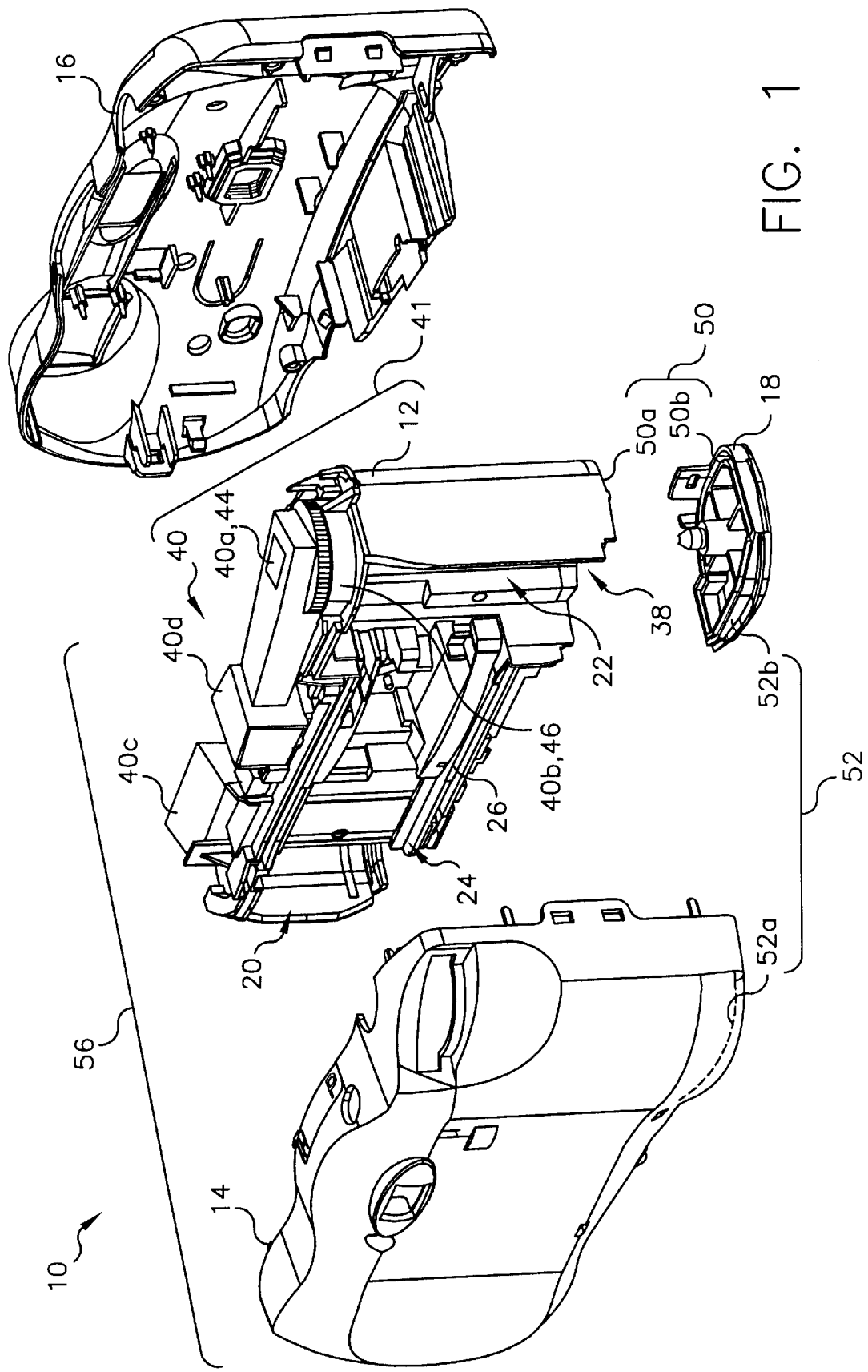
FIG. 1 is a rear perspective, partially exploded view of the camera of the invention. Some parts are simplified or deleted for clarity. The overlap-type light block subunit of the back cover is shown with a dashed line.
Figure 2:
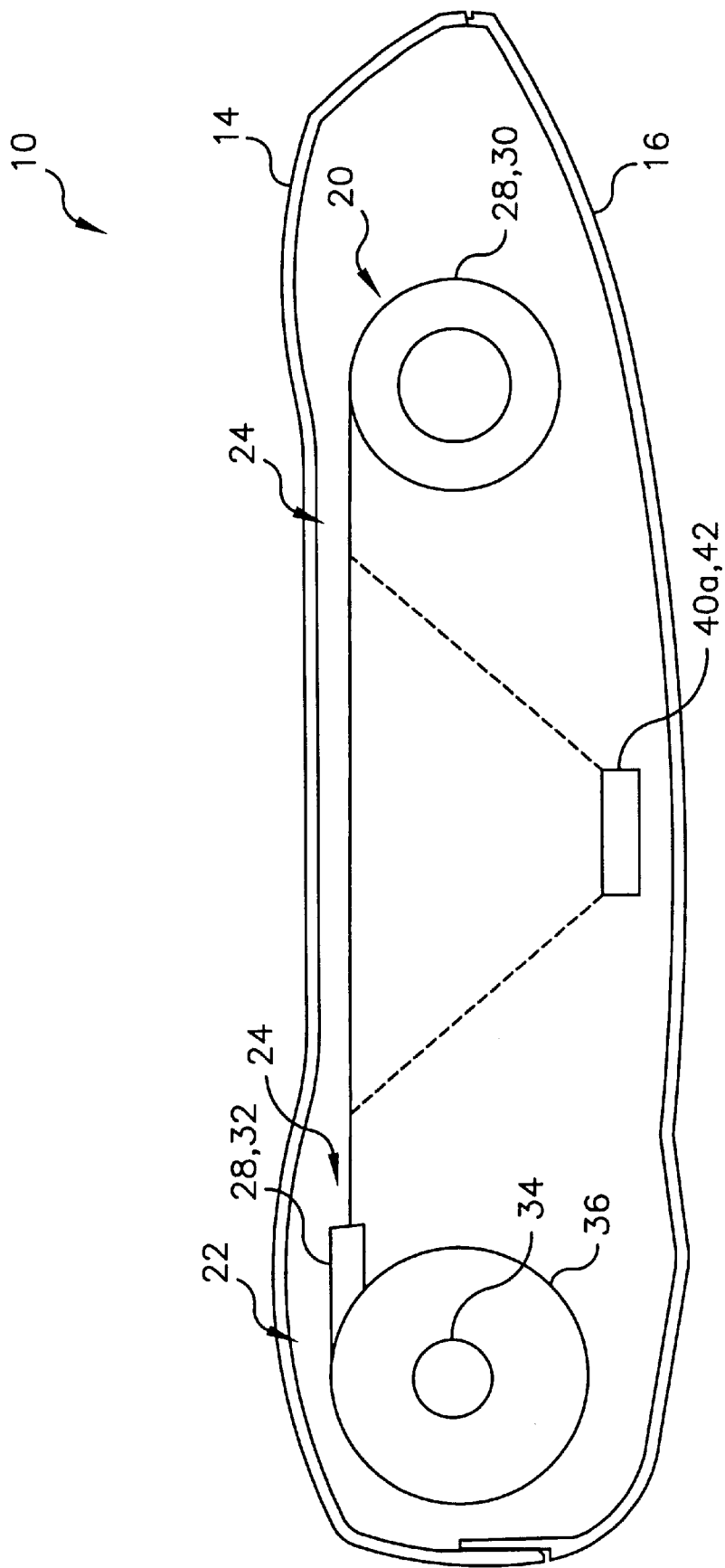
FIG. 2 is a semi-diagrammatical, cross-sectional view of the camera of FIG. 1.

The single use camera 10 of the invention has a frame 12, a back cover 14, a front cover 16, and an exposed-film door 18. The frame 12 has a film supply chamber 20 and a exposed-film chamber 22. The back cover 14 is attached to the frame 12. The front cover 16 is mounted over the frame 12 and is attached to one or both of the frame 12 and back cover 14.

The frame 12 and back cover 14 together define a film path 24 extending from the film supply chamber 20 across an intermediate section 26 of the frame 12 to the exposed-film chamber 22. A Filmstrip 28 having a main portion wound into a film roll 30 is disposed in the film supply chamber 20. A extended portion 32 of the filmstrip 28 extends, from the supply chamber 20, across the intermediate section 26 to the exposed-film chamber 22; and is attached to a spool 34 in the exposed-film chamber 22, preferably the internal spool 34 of a film cartridge 36. The film roll 30, in the film supply chamber 20, can have a hollow center or can be wound around another spool 34 or other support.

The exposed-film chamber 22 has an exposed-film removal opening 38 defined by the frame 12 and back cover 14. The exposed-film removal opening 38 communicates directly with the film path 24 and thus must be light-tightly closed for camera usage.

A film exposure-transport system 40 is mounted on the frame 12 (together referred to as the camera frame assembly 41) and provides for sequential exposure of the filmstrip 28 on a frame-by-frame basis. The details of the film exposure-transport system 40 are not critical to the invention and suitable systems are well known to those of skill in the art. For example, the film exposure-transport system 40 shown in the figures includes an exposure system 40a having such sub-components as a lens system 42, a shutter (not shown), and a shutter release 44. The film exposure-transport system 40 also includes a camera film drive 40b having a film sprocket (not shown) and a thumbwheel 46; a flash unit 40c; and a viewfinder 40d.

The exposed-film door 18 is mounted over the exposed-film removal opening 38. The door 18 is discrete from the covers 14,16 and the frame 12 and is fastened to the frame 12 so as to be repeatably removable and reattachable. The material of the door 18 is not critical, but the door 18 is preferably rigid and made out of the same material as the covers 14,16, that is, made out of a material recyclable in a common polymer feedstock with the covers 14,16.

The exposed-film door 18 light-tightly closes the exposed-film removal opening 38. The door 18, frame 12, and back cover 14 have light blocks 50,52 that are configured so as to permit removal of the door 18 from the camera 10 while the back cover 14, or preferably both covers 14,16, remain mounted over the frame 12. The frame 12 and door 18 together have subunits 50a,50b, respectively, of a U-shaped tongue-and-groove light block 50. The back cover 14 and the door 18 have subunits 52a,52b, respectively, of an overlap-type light block 52 that joins the tongue-and-groove light block 50 at the mouth of the "U". The door 18 light-tightly closes the exposed-film removal opening 38 independent of the front cover 16. For this reason, it is unnecessary for all or any part of the front cover 16 to be light-tight or to be mounted over the frame 12 in a light-tight manner. A non-light-tight front cover 16 is convenient for providing switch actuators 54 and the like without light baffling.

Figure 3:
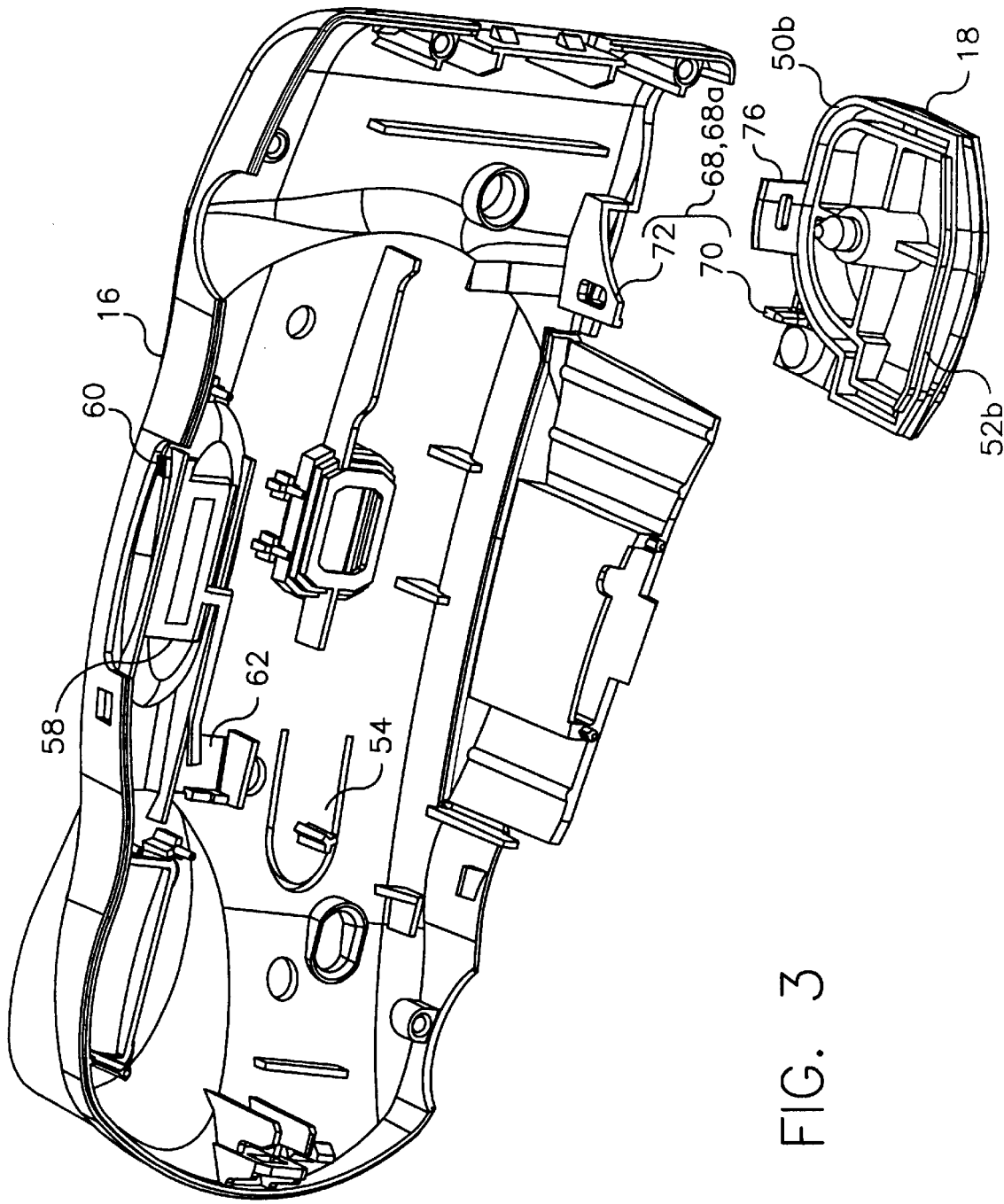
FIG. 3 is a rear perspective view of the front cover and exposed-film door of the camera of FIG. 1. Some parts are deleted for clarity.
Figure 4:
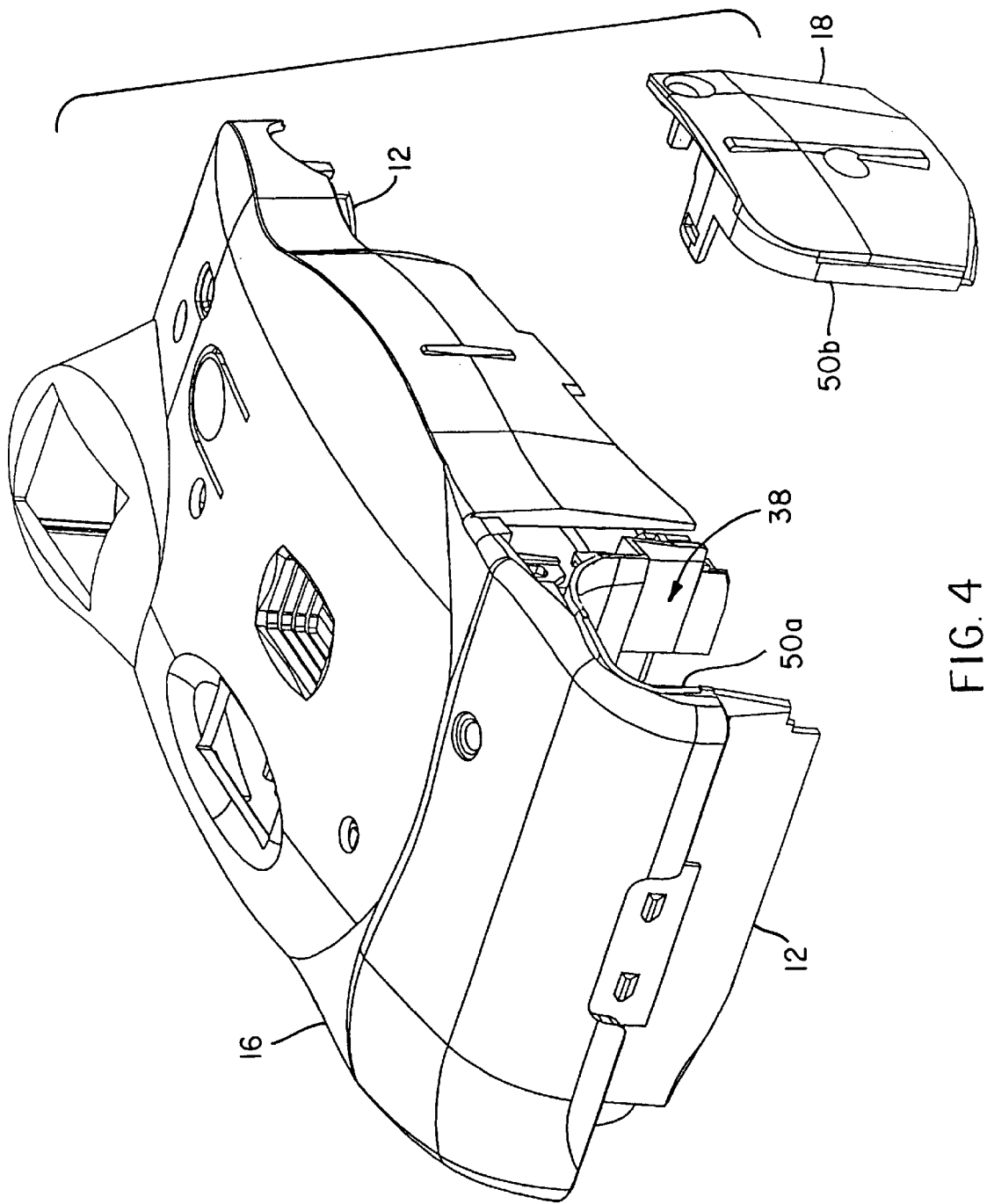
FIG. 4 is a front perspective view of the front cover and exposed-film door of FIG. 3.
Figure 5:
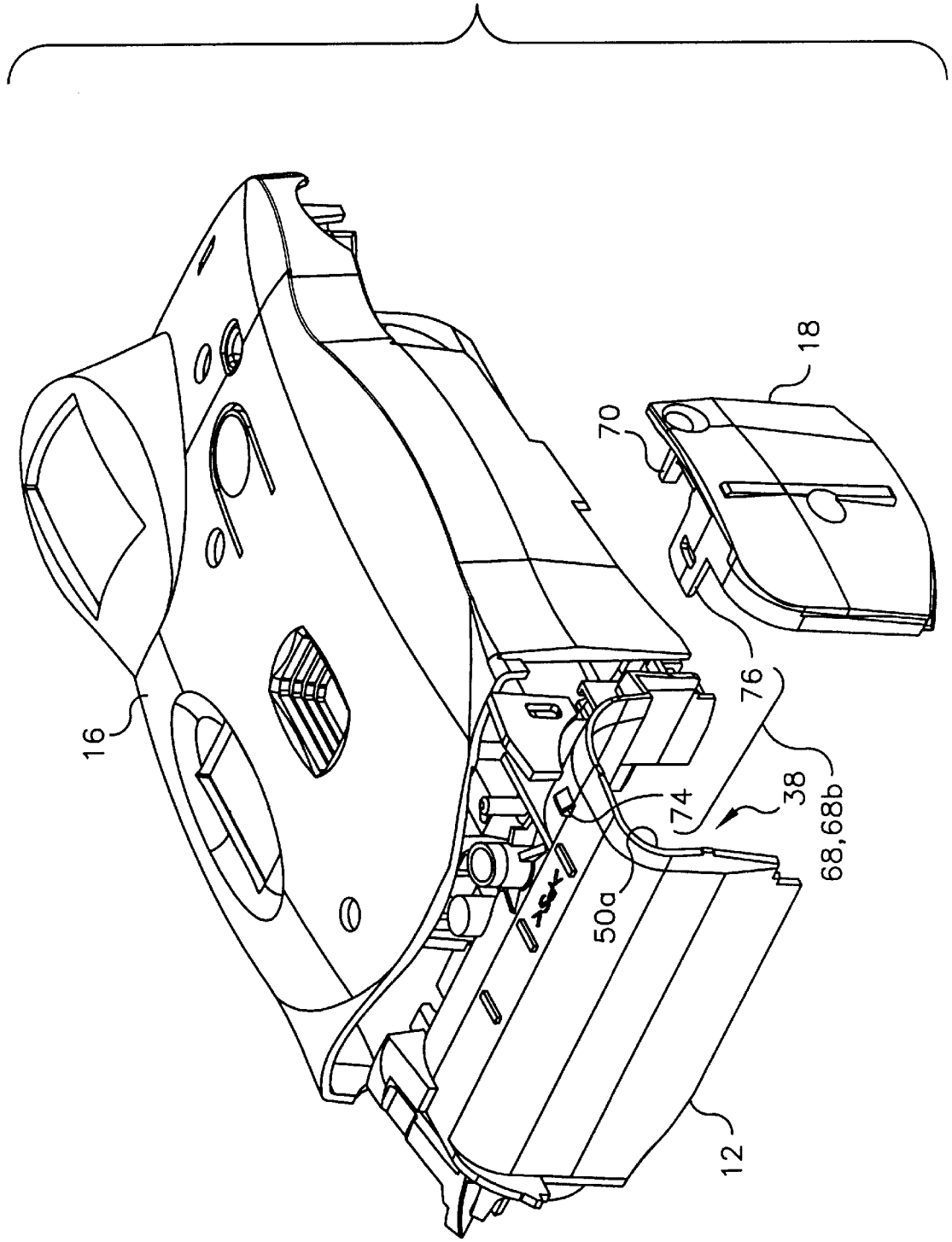
FIG. 5 is the same view as FIG. 4, except part of the front cover is deleted for clarity. The exposed-film door is detached.

In a preferred embodiment of the invention, the film exposure-transport system 40 is functional independent of the front cover 16. In other words, the camera frame assembly 41 and attached back cover 14 and door 18 (referred to hereafter collectively as "camera chassis 56") are capable of successfully exposing the filmstrip 28 on a frame-by-frame basis in the absence of the front cover 16. This permits ready use of the same camera chassis 56 with different front covers 16 and permits preassembly of camera chassises 56 followed by later mounting of the front cover 16. In this embodiment, the front cover 16 does provide some functions, but those functions are not critical to at least minimal operation of the camera chassis 56. For example, the front cover 16 protects and encloses internal camera 10 components and provides additional support to the frame 12 and film exposure-transport system 40. The front cover 16 can also provide switch actuators 54 and optional components, such as the slideable viewfinder format mask 58 shown in the figures. The mask 58, shown in FIG. 3, has an outwardly extending handle 60 and a protrusion 62 that actuates or deactuates a switch (not shown) on the film exposure-transport system 40 depending on the mask position. With optically encodeable film, such as Advanced Photo System™ (APS™) film; the switch can cause the film exposure-transport system 40 to optically mark a film frame 12 to indicate the viewfinder format mask 58 used when the frame 12 was exposed. The camera chassis 56 is functional without the front cover 16, but is limited to a default film frame format. Similarly, in this embodiment of the invention, the same camera chassis 56 can be used with different front covers 16 which include or lack one or more switch actuators 54, or the like; and thus allow or disallow one or more optional functions. This allows reuse of camera parts having subunits providing undesired or defective optional functions.

Figure 8:
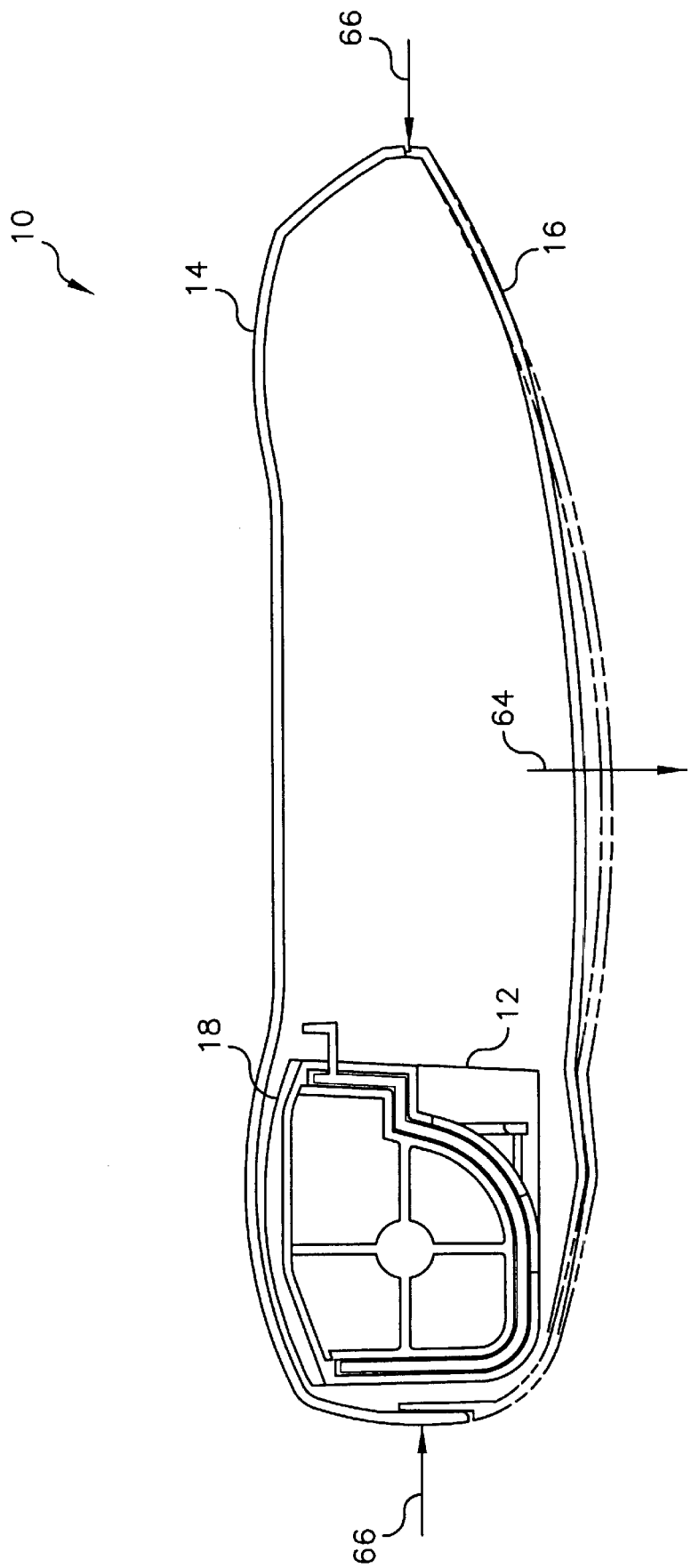
FIG. 8 is the same view as FIG. 7, but of a camera having the front cover unconstrained. Dashed lines show the conformation of the front cover when pressure is applied in the directions indicated by the arrows. Some dimensions are exaggerated for clarity.

The exposed film door 18, in combination with at least one of the frame 12 and the back cover 14, holds the front cover 16 in place. The door 18 constrains flexure of the front cover 16 in a direction, indicated by arrow 64 in FIG. 8, outward from the frame 12. When unconstrained, the front cover 16 tends to flex outward from the frame 12 when the camera 10 is squeezed. If the squeezing is longitudinal, that is, from the sides of the camera 10 along the longest dimension of the camera 10; the flexural is great enough to present a risk of relative movement of internal parts and resulting misalignment or jamming. Even is the flexure does not cause camera 10 damage, the flexure tends to cause "creaking" noises that are likely to distract the user during picture taking. FIG. 8 diagrammatically illustrates the effect of longitudinal squeezing, indicated by arrows 66, and unconstrained front cover flexure, indicated by arrow 64.

The exposed-film door 18 is joined to the front cover 16 and the exposed-film door 18 is joined to the frame 12 by connectors 68. It is preferred that the door 18 is tightly fastened to the frame 12 and that the front cover 16 is loosely fastened to the door 18, so that the door 18 catches the front cover 16. This permits relatively large tolerances for the dimensions of the front cover 16, while still providing constraint against outward flexure.

In the embodiment shown in the figures, the door 18 is joined to the front cover 16 by a loose-fit connector 68a. The connector 68a has a spur 70 that extends out from the door and through an eye 72 that extends inward from the front cover 16. The eye 72 is oversized, relative to the spur 70, in a direction parallel to the direction of flexure (indicated by arrow 64 in FIG. 8) of the front cover 16, if unconstrained. The spur 70 has a longer dimension perpendicular to the direction of flexure of the front cover 16. The spur 70 shown in the figures is rod-shaped but the spur 70 can have some other shape such as hook-shaped. The spur 70 can also be provided on the front cover 16 and the eye 72 on the door 18. Other types of attachment can also be used, such as miniature hook and loop tapes (Velcro™); peelable hot glues, and the like.

Figure 6:
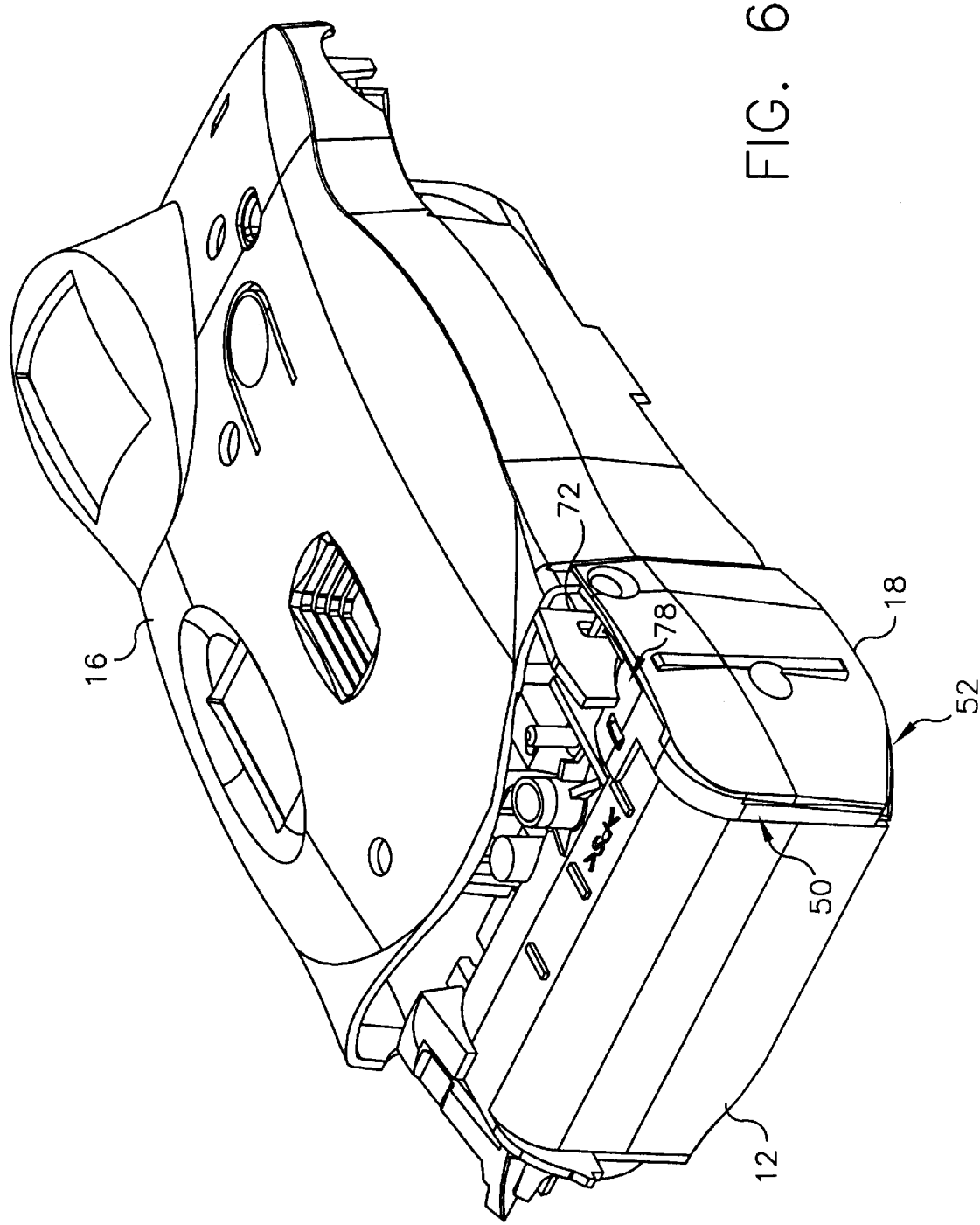
FIG. 6 is the same view as FIG. 5, except the exposed-film door is attached to the frame and front cover.
Figure 7:
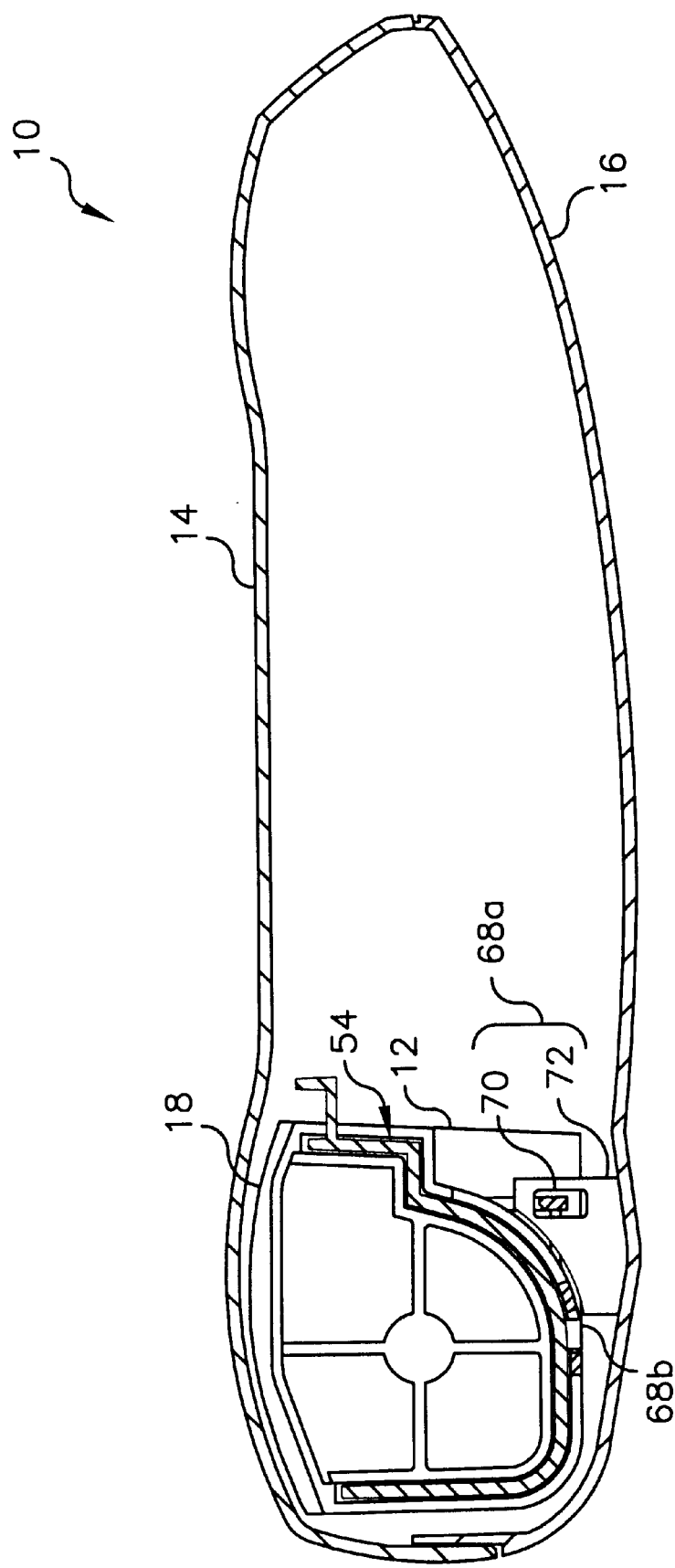
FIG. 7 is a simplified, horizontal cross-sectional view of the camera of FIG. 1.

In the same embodiment, the door 18 is snapped to the frame 12 by a snap fastener 68b. The snap fastener 68b has a post subunit 74 fixed to the frame 12 and a loop subunit 76 extending inward from the exposed-film door 18. The opening 38 in the loop subunit 76 is perpendicular to the opening 38 of the eye 72 of the loose-fit connector 68a. The loop subunit 76 extends out from the tongue-and-groove light block 50 opposite the overlap-type light block 52. The spur 70 of the loose-fit connector 68a is adjacent the loop subunit 76 and is opposite the overlap-type light block 52, but is offset from the tongue-and-groove light block 50. Adjoining both the loop subunit 76 and the eye 72, on the front cover 16 is a pry site 78 (indicated by arrow 78 in FIG. 6), in which a screwdriver can be inserted to pry open the door 18 for exposed film removal. During such prying, the snap fastener 68 releases, the spur 70 pivots out of the eye 72, and the light blocks 50,52 open; with minimal dislocation of the covers 14,16 and frame 12. The film 28 is removed and the door-less camera body can be returned for recycling as is, or the door 18 can be reattached prior to return of the empty camera.

The invention has been described in detail with particular reference to certain preferred embodiments thereof, but it will be understood that variations and modifications can be effected within the spirit and scope of the invention.

PARTS LIST camera 10
frame 12
back cover 14
front cover 16
exposed-film door 18
film supply chamber 20
exposed-film chamber 22
film path 24
intermediate section 26
filmstrip 28
film roll 30
extended portion 32
spool 34
film cartridge 36
exposed-film removal opening 38
film exposure-transport system 40
exposure system 40a
camera film drive 40b
flash unit 40c
viewfinder 40d
camera frame assembly 41
lens system 42
shutter release 44
thumbwheel 46
tongue-and-groove light block 50
subunits 50a,50b
overlap-type light block 52
subunits 52a,52b
switch actuator 54
chassis 56
viewfinder format mask 58
handle 60
protrusion 62
arrow 64
arrows 66
connector 68
loose-fit connector 68a
snap fastener 68b
spur 70
eye 72
post subunit 74
loop subunit 76
pry site 78

What is claimed is:

1. A single use camera for use with photographic film, said camera comprising:
   a frame;
   a back cover attached to said frame, said frame and back cover together defining a film path and an exposed-film removal opening communicating with said film path;
   a front cover mounted over said frame opposite said back cover;
   a door directly attached to said frame, said door light-tightly closing said opening independent of said front cover, said door constraining flexure of said front cover in a direction outward from said frame.

2. The camera of claim 1 wherein said door is tightly fastened to said frame and said front cover is loosely fastened to said door.

3. The camera of claim 1 wherein said door is rigid.

4. The camera of claim 1 wherein said front cover is non-light-tight.

5. The camera of claim 1 wherein said frame and said door together have a tongue-and-groove light-block.

6. The camera of claim 5 wherein said back and said door have an overlap-type light-block.

7. The camera of claim 1 further comprising a film exposure-transport system mounted on said frame, said film exposure-transport system being functional independent of said front cover.

8. The camera of claim 1 wherein said door is removable from said covers and said frame while said back cover is attached to said frame.

9. The camera of claim 8 wherein said door is removable from said covers and said frame while said front cover is mounted over said frame.

10. The camera of claim 9 wherein said front cover is held by said door and at least one of said frame and said back cover.

11. The camera of claim 10 wherein said front cover is caught by said door.

12. The camera of claim 11 wherein said door is snapped to said frame.

13. The camera of claim 12 wherein said frame and said door together have a tongue-and-groove light-block.

14. The camera of claim 13 wherein said front cover is non-light-tight.

15. The camera of claim 1 wherein said door is a separate piece from said covers and said frame, and said door is reversibly removable from said frame.

16. A single use camera for use with photographic film, said camera comprising:
   a frame;
   a back cover attached to said frame, said frame and back cover together defining a film path and an exposed-film removal opening communicating with said film path;
   a door snapped directly and removably to said frame, said door light-tightly closing said opening, said door being indirectly attached to said back cover; and
   a front cover directly attached to at least one of said frame and said back cover, said front cover being caught by said door.

17. The camera of claim 16 wherein said door is removable from all of said frame and said front and back covers while said front cover is attached to at least one of said frame and said back cover.

18. A single use camera for use with photographic film, said camera comprising:

a frame;

a back cover attached to said frame, said frame and back cover together defining a film path and an exposed-film removal opening communicating with said film path;

a door directly attached to said frame, said door light-tightly closing said opening; and a front cover attached to said door in non-light-tight relation, said front cover being attached to at least one of said frame and said back cover;

wherein said door is repeatedly reversibly removable from all of said frame and said front and back covers and said door has a spur disposed to catch said front cover.

19. The camera of claim 18 wherein said door is snapped to said frame.

20. The camera of claim 18 wherein said frame and said door together have a tongue-and-groove light-block.

21. The camera of claim 20 wherein said frame and said back have an overlap-type light-block.

* * * * *